United States Patent [19]

Knepper et al.

[11] 4,266,392
[45] May 12, 1981

[54] HEADER CUTTING ANGLE ADJUSTMENT MECHANISM

[75] Inventors: Larimer J. Knepper; James W. McDuffie; Robert A. Wagstaff, all of New Holland, Pa.

[73] Assignee: Sperry Corporation, New Holland, Pa.

[21] Appl. No.: 91,446

[22] Filed: Nov. 5, 1979

[51] Int. Cl.³ .............................................. A01D 41/02
[52] U.S. Cl. .................................. 56/14.5; 56/DIG. 9
[58] Field of Search ................. 56/14.5, 14.6, 15.5, 56/DIG. 9, 208, 209

[56] References Cited

U.S. PATENT DOCUMENTS

| | | | |
|---|---|---|---|
| 3,306,014 | 2/1967 | Halls et al. | 56/208 |
| 3,559,384 | 2/1971 | Bernhardt et al. | 56/14.6 |
| 3,638,407 | 2/1972 | Togami | 56/DIG. 9 |
| 3,699,753 | 10/1972 | Peak | 56/14.5 |
| 3,731,470 | 5/1973 | Cornish et al. | 56/208 |
| 3,981,125 | 9/1976 | Kerber et al. | 56/14.5 |
| 4,206,583 | 6/1980 | Week et al. | 56/208 |

Primary Examiner—Robert A. Hafer
Attorney, Agent, or Firm—Larry W. Miller; Frank A. Seemar; James R. Bell

[57] ABSTRACT

A mechanism for selectively adjusting the cutting angle of a combine header relative to the ground is disclosed wherein a front face member is pivotably mounted to the forward end of the feeder house for rotation about the forward transverse axis of the crop conveyor within the feeder house. Structure is provided to adjustably lock the front face member into one of a plurality of alternative rotated positions. With the disclosed mechanism, the header cutting angle can be adjusted relative to the ground without increasing the distance between the header and the crop conveyor, thereby maintaining the efficiency of the crop conveyor to engage crop material and transport it rearwardly.

22 Claims, 6 Drawing Figures

HEADER CUTTING ANGLE ADJUSTMENT MECHANISM

BACKGROUND OF THE INVENTION

The present invention relates generally to crop harvesting machines, commonly referred to as combines, and, more particularly, to providing a mechanism for adjusting the cutting angle of the header platform knife.

Combines, particularly the self-propelled type, are equipped to utilize a variety of crop harvesting headers, including headers specifically designed for harvesting corn, cereal grains and soy beans. Normally, these headers are attached to the forward end of the feeder house, which is a structure used to convey crop material from the header to the combine base unit for further harvesting treatment. As is shown in U.S. Pat. No. Reissue 26,512, the forward end of the feeder house can be constructed so that the header can be quickly and easily attached thereto. Usually, the feeder house structure is rectangular in shape and includes a rectangular crop inlet opening at the forward end.

Prior art cutting angle adjustment mechanisms are represented by U.S. Pat. No. 3,474,606 and U.S. Pat. No. 3,638,407. In general, these devices rely on a pivotal mounting directly between the header and the feeder house to swing the header away from the feeder house and thereby change the angular relationship between the header cutting means and the ground. One particular problem common to such devices is that, when the header swings away from the feeder house, the distance between the header and the feeder house increases, resulting in a less effective operation of the crop conveyor within the feeder house structure to engage crop material and transport it rearwardly.

This change in cutting angle is particularly significant for the harvest of soy beans. Because the grain portion of this crop lies closer to the ground than most grain crops, it is advantageous to bring the header cutterbar closer to the ground to reduce crop loss even though the potential for damaging the cutterbar by impacting it into the ground is increased. Also, since changes in cutting angle are directly related to the size of tires used on the combine, it is desirable to have the capability to vary the cutting angle in response to tire size changes.

SUMMARY OF THE INVENTION

It is an object of this invention to overcome the aforementioned disadvantages of the prior art by providing a front face member which is rotatably attached to the forward end of the combine feeder house.

It is a feature of this invention to be able to achieve the optimum cutting angle relative to the ground regardless of the size of tires used on the combine.

It is another object of this invention to provide a cutter angle adjustment mechanism which can vary the cutting angle of the header relative to the ground without increasing the distance between the header and the crop conveying means within the combine feeder house.

It is an advantage of this invention to provide a cutter angle adjustment mechanism for a combine which does not impair the efficiency of the crop conveying means within the combine feeder house to engage crop material and transport it rearwardly.

It is a further object of this invention to provide a simple means to selectively stabilize, restrict and control the rotation of a front face member rotatably attached to the forward end of a combine feeder house for changing the cutter angle of the header relative to the ground.

It is a still further object of this invention to provide a cutting angle adjustment mechanism for a combine which is durable in construction, and inexpensive of manufacture, facile in assemblage and simple and effective in use.

These and other objects, features and advantages are accomplished according to the instant invention by providing a mechanism for selectively adjusting the cutting angle of a combine header relative to the ground wherein a front face member is pivotably mounted to the forward end of the feeder house for rotation about the forward transverse axis of the crop conveyor within the feeder house, including structure to adjustably lock the front face member into any one of a plurality of alternate rotated positions. With this mechanism, the header cutting angle can be adjusted relative to the ground without increasing the distance from the header to the crop conveyor, thereby maintaining the efficiency of the crop conveyor to engage crop material and transport it rearwardly.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE INVENTION

Figure 1:
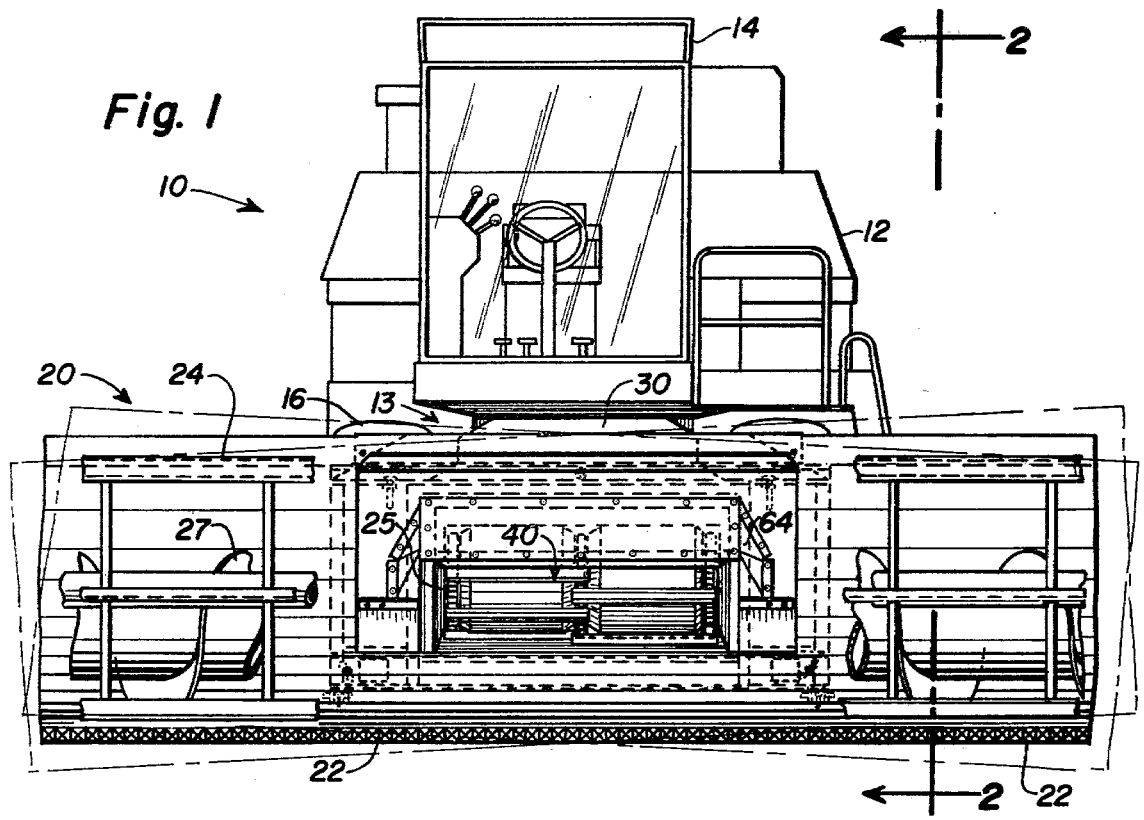
FIG. 1 is a front elevational view of a self-propelled combine, having a grain header attached thereto, incorporating the principles of the present invention.

Referring now to the drawings and particularly to FIG. 1, a front elevational view of the crop harvesting machine commonly referred to as a self-propelled combine can be seen. Left and right references are used as a matter of convenience and are determined by standing at the rear of the machine facing the forward end, the direction of travel. This combine 10 is generally comprised of a base unit 12, including a crop harvesting means 13 for separating the desired crop material from the waste crop material, a detachable crop gathering header 20 located forwardly of the base unit 12, a cab 14 elevated above the header 20 for full view of the crop harvesting process occurring therein, a wheeled frame 16 and a feeder house 30 for conveying crop material harvested by the header 20 rearwardly to the base unit 12 for treatment by the crop harvesting means 13, which, for example, can be a conventional threshing unit or the more recently developed rotary type axial flow harvesting unit, as is depicted in the drawings.

Figure 2:
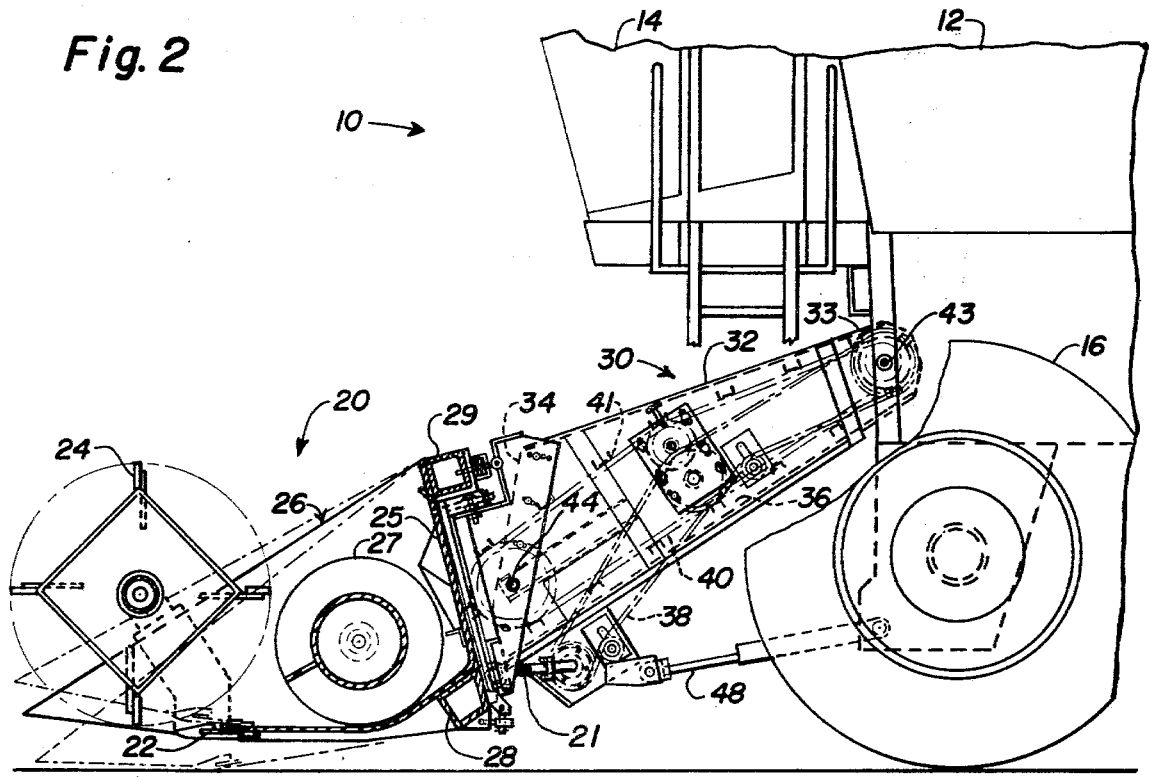
FIG. 2 is a cross sectional view of the forward portion of the combine, including the header and feeder house areas, shown in FIG. 1 taken along line 2—2.

Referring now to the cross sectional view of FIG. 2, a more detailed view of the general inner workings between the header 20, feeder house 30 and base unit 12 can be seen. The header 20 includes a forwardly disposed crop cutting means 22, seen in FIG. 2 in the form of a reciprocating type mower, for severing crop material from the ground. A reel 24 is disposed above and forwardly of the cutter means 22 to sweep crop material over the cutting means 22 and transport it rearwardly to the consolidating means 26, seen in the form of a consolidating auger 27. The consolidating auger 27 converges crop material towards a centrally disposed crop discharge opening 25, better seen in FIG. 1, for discharge to the feeder house structure 30.

As will be discussed hereinafter, varying the angle of the cutting means 22 relative to the ground, as can be seen in phantom in FIG. 2, is important to the efficiency of the crop gathering header, relative to loss of crop material in different types of crops. The frame 28 of header 20 includes a transversely disposed main header beam 29, which is used to support the header 20 from the feeder house 30. One skilled in the art will readily realize that this invention is not limited to a cutting means 22 of the reciprocating type nor a consolidating means 26 in the form of a consolidating auger 27.

As can also be seen in FIG. 2, the feeder house 30 generally includes a forwardly disposed, elongated body portion 32 defined by a rearward end 33 pivotably attached to the base unit 12 and a forward end 34 adjacent the header 20 for connection thereto. The body portion 32 includes a passageway 36 therethrough, terminating in a crop inlet opening 39 at the forward end 34, for allowing crop material to be transported rearwardly from the forward end 34 to the rearward end 33. A crop conveying means 40, normally in the form of an endless chain and slat apron conveyor 41, is positioned within the passageway 36 for transporting the crop material rearwardly. Generally, the apron conveyor 41 is driven by a drive shaft 43 positioned at the rearward end 33. A driven shaft 44 adjacent the forward end 34 enables the endless apron conveyor 41 to rotate into an operative position for transporting crop material rearwardly.

A crop conveyor drive means 38, which receives rotational power from the header drive shaft 21, is also found mounted on the feeder house 30. The height of the header 20 relative to the ground is controlled by a header lift means 48 interconnecting the feeder house 30 and the base unit 12. By extending the header lift means 48 and pivoting the rearward end 33 of the feeder house 30 about the drive shaft 43, thereby rotating the feeder house 30 about the drive shaft 43, the header 20 can be lifted from the ground without significantly changing the discharge point of the apron conveyor 41 relative to the base unit 12.

Figure 4:
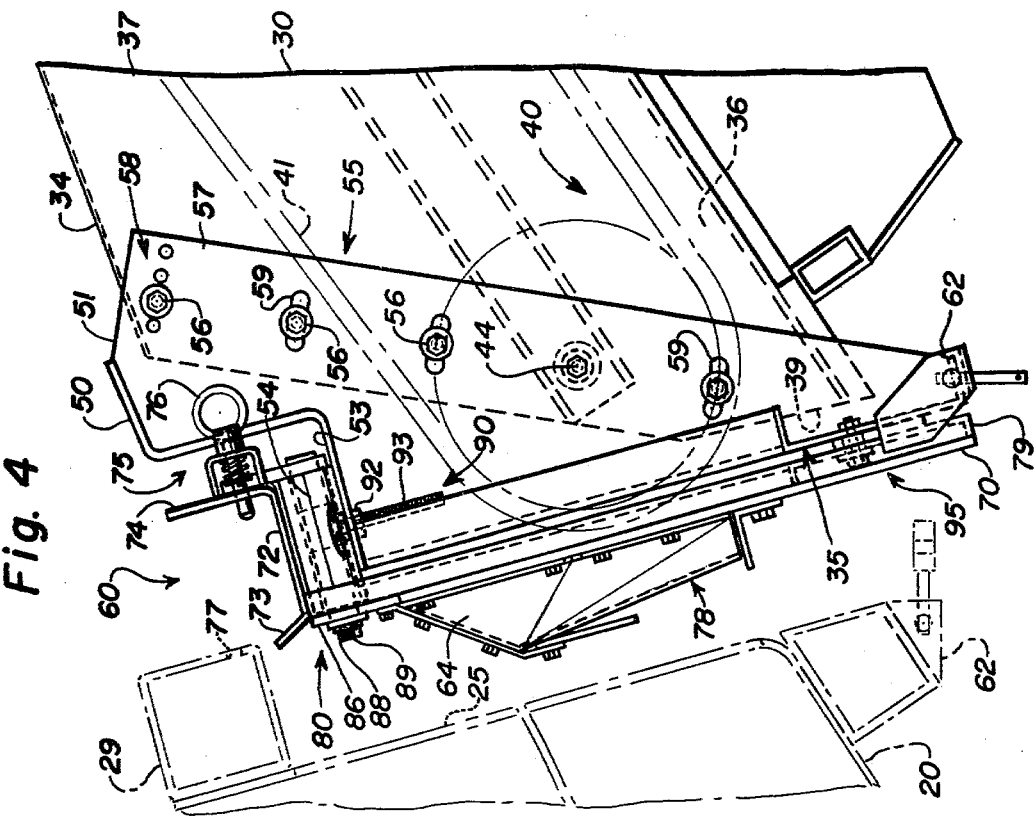
FIG. 4 is a side elevational view of the forward portion of the feeder house showing the front face member and the cradle assembly, the detachable header being shown in phantom proximate to the cradle assembly.

Referring now to FIG. 4, an enlarged view of the forward end 34, showing the front face member 50 and a detached header 20 in phantom proximate thereto, can be seen. The front face member 50 is a separate structure pivotably attached to the forward end 34 of the feeder house 30 for rotational movement such that the top 51 of the front face member 50 is movable in a fore-and-aft direction. The front face member 50 includes an offset section 53 substantially registrable with the main header beam 29 for supporting the header 20 in a detachable operable position.

Although it is possible to attach the front face member 50 to the feeder house 30 without having a fixed pivot point, it has been found to be preferable to use the axis defined by the driven shaft 44 of the conveying means 40 as a fixed pivot point. By such an arrangement, since the distance between the discharge opening 25 and the conveying means 40 is fixed, the efficiency of the crop conveying means 40 to engage the crop material discharged by the header and to convey it rearwardly is not impaired by rotation of the front face member 50.

The front face member 50 includes side sheets 57 which project rearwardly in close proximity to the sidewalls 37 of the feeder house 30. The side sheets 57 include a plurality of multi-positionable apertures 58, which can also be in the form of slot-shaped apertures 59. These apertures 58, 59 are registerable with holes (not shown) in the sidewalls 37. Bolts 56, interfitting corresponding apertures and holes serve to restrict and control the extent of movement of the front face member 50 and to act as a stabilizing means 55.

Figure 3:
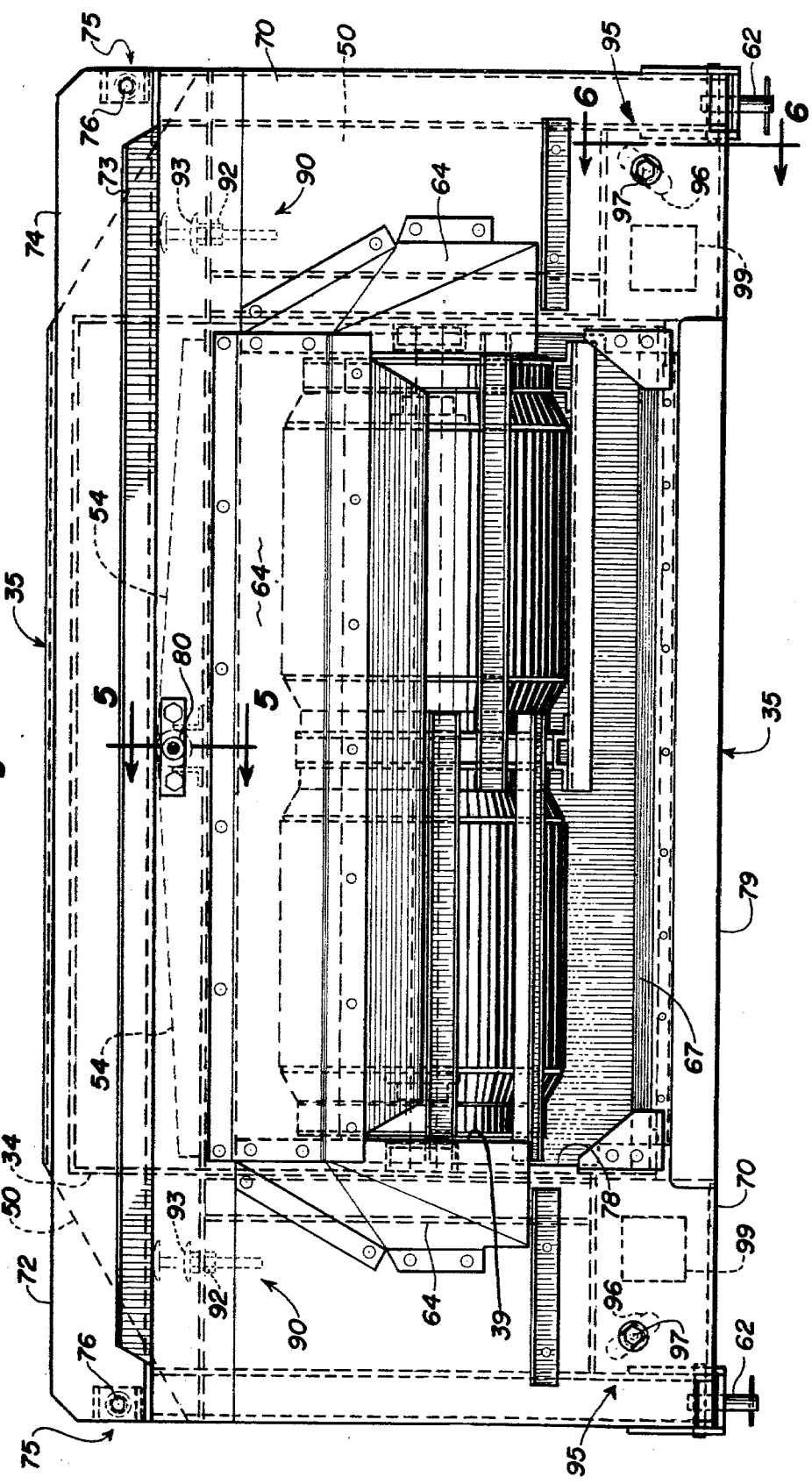
FIG. 3 is an enlarged front elevational view of the cradle assembly at the forward end of the feeder house, the header being removed for clarity.

The lateral float mechanism 60 can be best seen in FIGS. 3 and 4. A separate cradle assembly 70 is pivotably affixed to the forward end 34 of the feeder house 30 for rotation generally about the direction of travel. In the preferred embodiment seen in FIGS. 3 and 4, the cradle assembly 70 is pivotably affixed to the center of the offset section 53 in the front face member 50 by a pivot means 80; however, the cradle assembly 70 could instead be attached to the forward end 34 of the feeder house 30. For purposes of description, the cradle assembly 70 will hereinafter be referred to as being pivotably affixed to an attachment face 35, which is defined as being that part of the feeder house 30 to which the header 20 is attached.

The cradle assembly 70 includes a crop passage opening 78 which is registrable with both the header discharge opening 25 and the crop inlet opening 39. The cradle assembly 70 also includes a nesting portion 72 which overlaps the offset section of 53 of the attachment face 35 for receiving and attaching the main header beam 29. The nesting portion 72 has a preferred substantially U-shaped configuration, as best seen in FIG. 4, with the forward leg 73 being shorter than the rear leg 74 and bent forwardly for facilitating the connection between the main header beam 29 and the nesting portion 72. To either side of the pivot 80, the nesting portion 72 includes a locking means 75 in the form of a spring loaded locking pin 76 which is positioned to interfit within corresponding holes 77 in the main header beam 29 to lock the beam 29 into an operative position, wherein the crop discharge opening 25, the crop passage opening 78 and the crop inlet opening 39 are substantially aligned.

To control the pivotal movement of the cradle assembly 70 about the pivot 80, a pivot control means 90, seen in the form of a screw device 92 to each side of the pivot 80, operates to limit the rotation of the nesting portion 72. The bolts 93, forming part of the screw device 92, are threaded into the offset section 53 of the attachment face 35 and can be adjusted upwardly to restrict the extent of possible rotation of the cradle assembly 70. Moreover, by proper manipulation of the left and right bolts 93 in conjunction with each other, the cradle assembly 70 can be locked into an infinite number of rotated positions within the confines imposed by the physical constraints of the screw device 92 itself. It should be further realized by one skilled in the art that one or more hydraulic cylinders interconnecting either the base unit or the feeder house and the cradle assembly would be effective as a pivot control means. To further limit the pivotal movement of the cradle assembly 70 and to provide support for the nesting portion 72 upon full left or full right rotation, the offset section 53 of the attachment face 35 includes an inclined ramp 54 on each side of the pivot means 80.

A latch mechanism 62 locks the lower end 79 of the cradle assembly 70 to the corresponding portion of the header 20 to further aid in retaining the header 20 in an operative position relative to the cradle assembly 70 and the feeder house 30. Latch mechanism 62 is shown in the preferred embodiment as being of the overcenter variety. The cradle assembly 70 also includes a forwardly projecting crop retention hood 64, which extends into the discharge opening 25 of the header 20 to retain crop material within the feeder house passageway 36.

Figure 5:
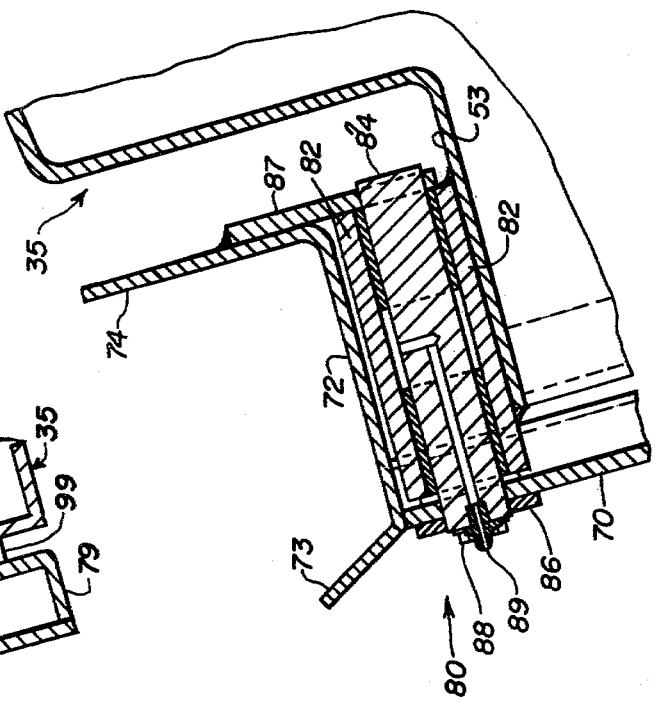
FIG. 5 is a cross sectional view of the cradle assembly pivot means taken along line 5—5 in FIG. 3.

The pivot 80 is best seen in the enlarged view of FIG. 5. A tubular housing 82 is rigidly affixed to the attachment face 35. A circular dowel 84 rotatably extends through the housing 82 and includes a front plate member 86. As is seen in FIG. 3 and FIG. 5, front plate 86 is detachably affixed to the cradle assembly by two screws 88 to facilitate the removal and/or repair of the pivot 80. A rear plate member 87 is rigidly affixed to the rear leg 74 of the nesting portion 72 and is supported by the dowel 84. FIG. 5 reveals the provision of a grease zerk 89 for renewing the supply of lubricant between the dowel 84 and the housing 82. It should be noted that the grease zerk 89 may not be essential; however, it is preferable.

Figure 6:
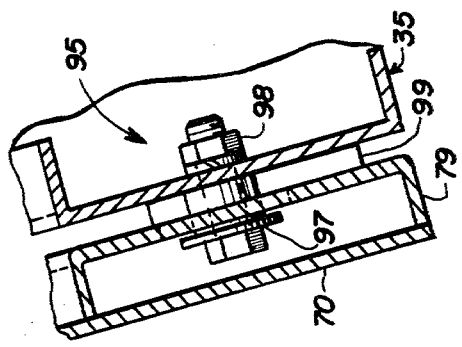
FIG. 6 is a cross sectional view showing the retaining means interconnecting the cradle assembly and a feeder house taken along line 6—6 in FIG. 3.

To keep the cradle assembly 70 from separating from the attachment face 35, particularly at the lower portion 79 thereof, the cradle assembly 70 includes a retaining means 95 interacting between the lower portion 79 of the cradle assembly 70 and the attachment face 35. As can be best seen in FIG. 3 and FIG. 6, the lower portion 79 includes left and right slot shaped holes 96 through which a bolt and washer assembly 97 extends to thread into the attachment face 35, or in the alternative, held in place on the attachment face 35 by a nut 98. The slot shaped holes 96 allow rotation of the cradle assembly 70 while the bolt and washer assembly 97 keeps the cradle assembly 70 in close proximity to the attachment face 35. A spacer 99, shown in the form of a plastic block, keeps the cradle assembly 70 and the attachment face 35 from coming into sliding contact with each other. It should be further realized by one skilled in the art that other forms of spacers, such as a roller, could be similarly used.

To operate the lateral float mechanism 60, the pivot control means 90 is manipulated to effect the desired rotation of the cradle assembly 70 about the pivot means 80. The header 20, being attached to the cradle assembly 70, is rotatable therewith and is positionable to correspond to the slope of the ground. Total rotation of the cradle assembly 70 and attached header 20, from a full left rotation to a full right rotation, is in the range of six to eight degrees, representing approximately 3½ degrees to each side of horizontal. As the cradle assembly 70 is rotated, the crop passage opening 78 therethrough becomes slightly askewed to the crop inlet opening 39 at the beginning of the feeder house passageway 36. To prevent a loss of crop material because of the askewed openings 36, 78 and because of the separation between the cradle assembly 70 and the attachment face 35 due to the presence of the spacer 99, a flexible seal 67, as can be best seen in FIG. 3, extends between the cradle assembly 70 and the front face member 50.

Since different crops require different angles for the cutting means 22 relative to the ground for best cutting efficiency and least crop loss, the cutting means/ground angular relationship can be selectively adjusted by manipulating the stabilizing means 55 such that the front face member 50 is rotated in a fore-and-aft direction, thereby affecting a corresponding angular change between the cutting means 22 and the ground. Providing a pivot point at the axis corresponding to the driven shaft 44 of the endless apron conveyor 41 keeps the header 20 at a constant distance from the endless apron conveyor 41 so that the efficiency of the crop conveying means 40 to engage the crop material and transport it rearwardly is not impaired.

By providing a combine with both a lateral float mechanism 60, in the form of a cradle assembly 70, and a front face member 50, one skilled in the art should readily realize that a very flexible header mounting combination is obtained. Furthermore, an adjustment of the distance between the cutting means 22 and the ground can be easily obtained by manipulation of the header lift means 48 (e.g. extension and retraction of the hydraulic cylinder), which extends between the feeder house 30 and the base unit 12.

It will be understood that various changes in the details, material, steps and arrangement of parts which have been described and illustrated in order to explain the nature of the invention, will occur to and may be made by those skilled in the art upon a reading of the disclosure within the principles and scope of the invention.

Having thus described the invention, what is claimed is:

1. A feeder house extending from a mobile combine base unit for transferring harvested crop material collected by a detachable header to said base unit for further harvesting treatment, said header including a transversely disposed cutting means for severing crop material from the ground, said feeder house comprising:

a frame;

an elongated forwardly extending body portion supported by said frame, said body portion having a forward end adjacent the header, a rearward end adjacent the base unit, and a passageway therethrough between said forward and rearward ends;

a crop conveying means housed within said passageway for transporting said crop material rearwardly to the base unit, said crop conveying means including a transverse rotatable shaft member adjacent and substantially parallel to said forward end, said shaft member defining a transverse axis substantially perpendicular to the line of travel of said combine, said transverse axis being rearward of the header; and a front face member selectively movably attached to said body portion for selective rotative movement in a fore-and-aft direction relative to said body portion, said front face member projecting forwardly for connection to the header such that the header is movable with said front face member, said front face member including stabilizing means for selectively restricting and controlling said movement about said transverse axis, whereby the angle of cut of the header cutting means relative to the ground can be selectively varied according to the extent of fore-and-aft rotative movement of said front face member relative to said forward end.

2. The feeder house of claim 1 wherein said front face member is pivotable about said transverse axis such that said front face member can be rotated in a fore-and-aft direction to vary the cutting angle of the cutting means without increasing the distance between the header and said crop conveying means.

3. The feeder house of claim 2 wherein said crop conveying means includes an endless chain and slat conveyor operable within said passageway and supported at least in part on said transverse shaft member.

4. The feeder house of claim 3 wherein the header includes a frame having a transversely disposed main header beam, said front face member including an offset section for receiving the main header beam, said offset section including a header retention means for maintaining the header in an operable position relative to said feeder house.

5. The feeder house of claim 4 wherein said body portion includes two laterally spaced sidewalls extending between said forward and rearward ends, said sidewalls having at least one hole therein, said front face member having side sheets extending rearwardly along said sidewalls, said side sheets have a plurality of apertures therein registerable with and corresponding to said at least one hole in said sidewall, said stabilizing means including a bolt interconnecting one of said apertures and said at least one corresponding hole to selectably lock said front face member into one of a plurality of alternative positions.

6. The feeder house of claim 5 wherein said apertures are slot-shaped and registerable with said at least one, hole whereby said front face member is adjustable in an infinite number of positions within the confines of said slot-shaped apertures.

7. The feeder house of claim 5 or 6 wherein said stabilizing means further includes a plurality of bolts to interfit a corresponding number of said apertures and holes.

8. The feeder house of claim 7 wherein said front face member is pivotable through an arc having a central angle of approximately 10 degrees.

9. In a feeder house operably extending from a combine base unit for transferring crop material, collected by a forwardly positioned detachable crop harvesting header, from said header to said base unit, said feeder house having an elongated body portion including a forward end adjacent said header, a rearward end adjacent said base unit and a passageway therethrough interconnecting said forward and rearward ends; a crop conveying means operably positioned within said passageway for transporting said crop material rearwardly towards said base unit, said crop conveying means including a rotatable transverse shaft member rearward of and adjacent to said forward end, said shaft member defining a transverse axis parallel to said forward end; and drive means for driving said crop conveying means, the improvement wherein said feeder house comprises:
a front face member pivotably attached to said transverse axis, said front face member including a header connecting means for detachably connecting the header to said feeder house and a stabilizing means for restricting and controlling pivotal movement of said front face member about said transverse axis in a plurality of alternate rotated positions.

10. The feeder house of claim 9 wherein the header includes a frame having a transverse main header beam, said header connecting means including an offset section registerable with the main header beam for receiving the beam and locking same into an operable position relative to said crop conveying means.

11. The feeder house of claim 10 wherein said body portion includes two laterally spaced sidewalls extending between said forward and rearward ends, said sidewalls having at least one hole therein, said stabilizing means including said front face member having side sheets extending rearwardly along said sidewalls, said side sheets have a plurality of apertures therein registerable with and corresponding to said at least one hole in said sidewall, said stabilizing means further including a bolt interconnecting one of said apertures and said at least one corresponding hole to selectably lock said front face member into one of a plurality of alternative positions.

12. The feeder house of claim 11 wherein said apertures are slot-shaped and registerable with said at least one, hole whereby said front face member is adjustable in an infinite number of positions within the confines of said slot-shaped apertures.

13. The feeder house of claim 11 or 12 wherein said stabilizing means further includes a plurality of bolts to interfit a corresponding number of said apertures and holes.

14. The feeder house of claim 13 wherein said crop conveying means includes an endless chain and slat apron conveyor operable within said passageway and supported at least in part on said transverse shaft member.

15. The feeder house of claim 14 wherein the header includes a crop cutting means for severing crop material from the ground, said front face member being pivotable through an arc having a central angle of approximately 10 degrees, whereby the angular relation of the crop cutting means relative to the ground can be selectively varied by pivoting said front face member about said transverse axis.

16. In a combine for harvesting crop material having a mobile base unit; a crop treating means housed within said base unit for harvestingly treating the crop material; a detachable header forward of said base unit including a crop cutting means for severing crop material from the ground; a vertically adjustable, forwardly extending feeder house interconnecting said header and said base unit, said feeder house having a forward end adjacent said header, a rearward end adjacent said crop harvesting means and a passageway therethrough between said forward and rearward ends for movement of crop material from said header to said crop treating means; an endless chain and slat apron conveyor operably housed within said feeder house passageway for transporting crop material rearwardly from said header to said crop harvesting means, said conveyor including a rotatable transverse shaft member adjacent said forward end for supporting, at least in part, said conveyor, said shaft member defining a transverse axis rearward of said header; a feeder house lift means for adjusting the vertical position of said feeder house and attached header relative to the ground; and drive means for driving said crop treating means and said crop conveying means, an improved feeder house comprising:
a front face member selectively movably attached to said feeder house adjacent said forward end, said front face member being rotatably movable in a fore-and-aft direction relative to said feeder house, said front face member including a header connecting means for detachably connecting said header to said feeder house and a stabilizing means for limiting the extent of rotational movement of said front face member.

17. The combine of claim 16 wherein said header includes a frame having a transverse main header beam, said header connecting means including an offset section registerable with said main header beam for receiving said beam and a header retention means for locking said beam into an operable position relative to said crop conveying means.

18. The combine of claim 17 wherein said body portion includes two laterally spaced sidewalls extending between said forward and rearward ends, said sidewalls having at least one hole therein, said front face member having side sheets extending rearwardly along said sidewalls, said side sheets have a plurality of apertures therein registerable with and corresponding to said at least one hole in said sidewall, said stabilizing means including a bolt interconnecting one of said apertures and said at least one corresponding hole to selectably lock said front face member into one of a plurality of alternative positions.

19. The combine of claim 18 wherein said apertures are slot-shaped and registerable with said at least one hole, whereby said front face member is adjustable in an infinite number of positions within the confines of said slot-shaped apertures.

20. The combine of claim 19 wherein said front face member is rotatable through an arc having a central angle of approximately 10 degrees, whereby the angular relation of said crop cutting means relative to the ground can be selectively varied by rotating said front face member in a fore-and-aft direction.

21. The combine of claim 16 or 20 wherein said front face member is pivotable about said transverse axis such that said front face member can be rotated in a fore-and-aft direction to vary the angular relation of said crop cutting means relative to the ground without increasing the distance between said header and said crop conveying means.

22. The feeder house of claim 21 wherein said feeder house lift means includes a hydraulic cylinder operably extending between said base unit and said feeder house to move said forward end in a swinging movement about said rearward end.

* * * * *